(12) United States Patent
Bauer (10) Patent No.: US 7,821,932 B2
(45) Date of Patent: Oct. 26, 2010

(54) SYSTEM AND METHOD FOR INTELLIGENT SIGNAL ROUTING IN A TELEVISION PRODUCTION STUDIO

(75) Inventor: Christopher J. Bauer, Yardley, PA (US)

(73) Assignee: Disney Enterprises, Inc., Burbank, CA (US)

( * ) Notice: Subject to any disclaimer, the term of this patent is extended or adjusted under 35 U.S.C. 154(b) by 127 days.

(21) Appl. No.: 12/145,553

(22) Filed: Jun. 25, 2008

(65) Prior Publication Data
US 2009/0323699 A1 Dec. 31, 2009

(51) Int. Cl.
*H04J 3/14* (2006.01)
*H04L 12/56* (2006.01)

(52) U.S. Cl. .................. 370/230; 370/235; 370/400; 370/428

(58) Field of Classification Search ............ None
See application file for complete search history.

(56) References Cited

U.S. PATENT DOCUMENTS

| 5,307,456 | A | 4/1994 | Mackay |
| 6,108,308 | A | 8/2000 | Flavin et al. |
| 7,570,649 | B2 * | 8/2009 | Qian et al. .......... 370/400 |
| 2002/0191250 | A1 * | 12/2002 | Graves et al. ........... 359/128 |
| 2006/0164546 | A1 * | 7/2006 | Adachi ........... 348/441 |
| 2007/0073906 | A1 | 3/2007 | Paulsen |
| 2007/0143576 | A1 | 6/2007 | Ellgen et al. |
| 2007/0245019 | A1 * | 10/2007 | Westberg et al. ......... 709/225 |
| 2008/0019388 | A1 | 1/2008 | Harmon et al. |
| 2008/0141303 | A1 * | 6/2008 | Walker et al. .......... 725/39 |
| 2008/0281968 | A1 * | 11/2008 | Rodriguez ............ 709/226 |
| 2009/0052444 | A1 * | 2/2009 | Ringen ............ 370/389 |
| 2009/0265733 | A1 * | 10/2009 | McKelvey .......... 725/32 |

FOREIGN PATENT DOCUMENTS

GB   2 331 427 A   5/1999

OTHER PUBLICATIONS

Schmid "Routing in Transition" XP002544458, 2006.

* cited by examiner

*Primary Examiner*—Chi H Pham
*Assistant Examiner*—Soon-Dong D Hyun (57) ABSTRACT

A system for signal routing in a television production studio includes a core router operatively coupled to a plurality of peripheral routers, each of the plurality of peripheral routers having an associated control system, and a core router control system coupled to the core router and to coupled to the plurality of peripheral routers, the core router control system configured to allow any peripheral router to communicate with any other peripheral router through the core router and irrespective of the control system associated with each peripheral router.

19 Claims, 5 Drawing Sheets

SYSTEM AND METHOD FOR INTELLIGENT SIGNAL ROUTING IN A TELEVISION PRODUCTION STUDIO

BACKGROUND

A television production studio includes a number of different television devices connected to a number of different signal routers. Each signal router is interconnected to other signal routers to deliver an asset from one television device to another. An asset may be any information that is part of a television production studio. A television device can be, for example, a video server, a graphics device or any television device. Examples of assets include television programming, graphics that may be incorporated into a television broadcast, etc. Each television device having an asset is accessible by at least one signal router. The basic infrastructure of a television production studio includes the ability to route a signal containing the asset from one television device to another. Further, a television studio incorporates many different television technologies, such as, for example, standard definition (SD), high definition (HD), digital, analog, etc. Because of these different technologies, a television studio typically includes many different routers. Typically, there may be one or two different types of routers, with a number of each router type being commonly controlled. This arrangement leads to an infrastructure having multiple router control systems with some number of routers being controlled by each control system.

Further, in some television studios, the individual routers are all interconnected, resulting in a haphazard connection topology that requires each router to have multiple connections to each of the other routers. This results in excessive routing complexity. Further complicating this infrastructure is that operations and maintenance personnel must keep track of which television device is associated with which router. As a result, a typical television studio has become significantly complex and difficult to maintain.

One possible solution is to replace the existing routers with a single router. Unfortunately, for a large studio, such a router would be extremely complex and costly to implement. Further, most television studios have a significant capital investment in existing infrastructure, and it would be preferable to fully amortize that investment. Also, a single router creates a single point of failure, which can be extremely costly to make failsafe. Further, a single large router capable of supporting a large studio infrastructure would be inefficient since many of the connections between devices would never be required.

Therefore, it would be desirable to improve the routing efficiency of an existing television studio, while allowing the use of existing routing equipment.

SUMMARY

Embodiments of a system for signal routing in a television production studio include a core router operatively coupled to a plurality of peripheral routers, each of the plurality of peripheral routers having an associated control system, and a core router control system coupled to the core router and coupled to the plurality of peripheral routers, the core router control system configured to allow any peripheral router to communicate with any other peripheral router through the core router irrespective of the control system associated with each peripheral router.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

The system and method for intelligent signal routing in a television production studio will be described in the context of routing television assets, including standard definition and high definition television signals in a television production studio. A television production studio can be any collection of television production equipment, assets, etc., and can be located at a single facility, or may include elements that are distributed over a wide geographical area and that are connected to form a network. However, the system and method for intelligent signal routing in a television production studio can be used to route any signals in a television production studio or networked television production studio. Further, the logic that implements the system and method for intelligent signal routing in a television production studio can be integrally located at a single television production studio, or can be distributed among a number of elements in a television production studio or network.

A television device can be a video server, graphics device or any device configured to move, broadcast, transmit media, data, etc. An asset can be a graphical image, video, a sound clip, a graphics title or a short animation (which can be played from a video server), or any other data, media type or content, etc.

The system and method for intelligent signal routing in a television production studio can be implemented in hardware, software, or a combination of hardware and software. When implemented in hardware, the system and method for intelligent signal routing in a television production studio can be implemented using specialized hardware elements and logic. When the system and method for intelligent signal routing in a television production studio is implemented at least partially in software, the software can be used to control the transfer of various television assets among various components in a television production studio. The software can be stored in a memory and executed by a suitable instruction execution system (microprocessor). The hardware implementation of the system and method for intelligent signal routing in a television production studio can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the system and method for intelligent signal routing in a television production studio comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

Figure 1:
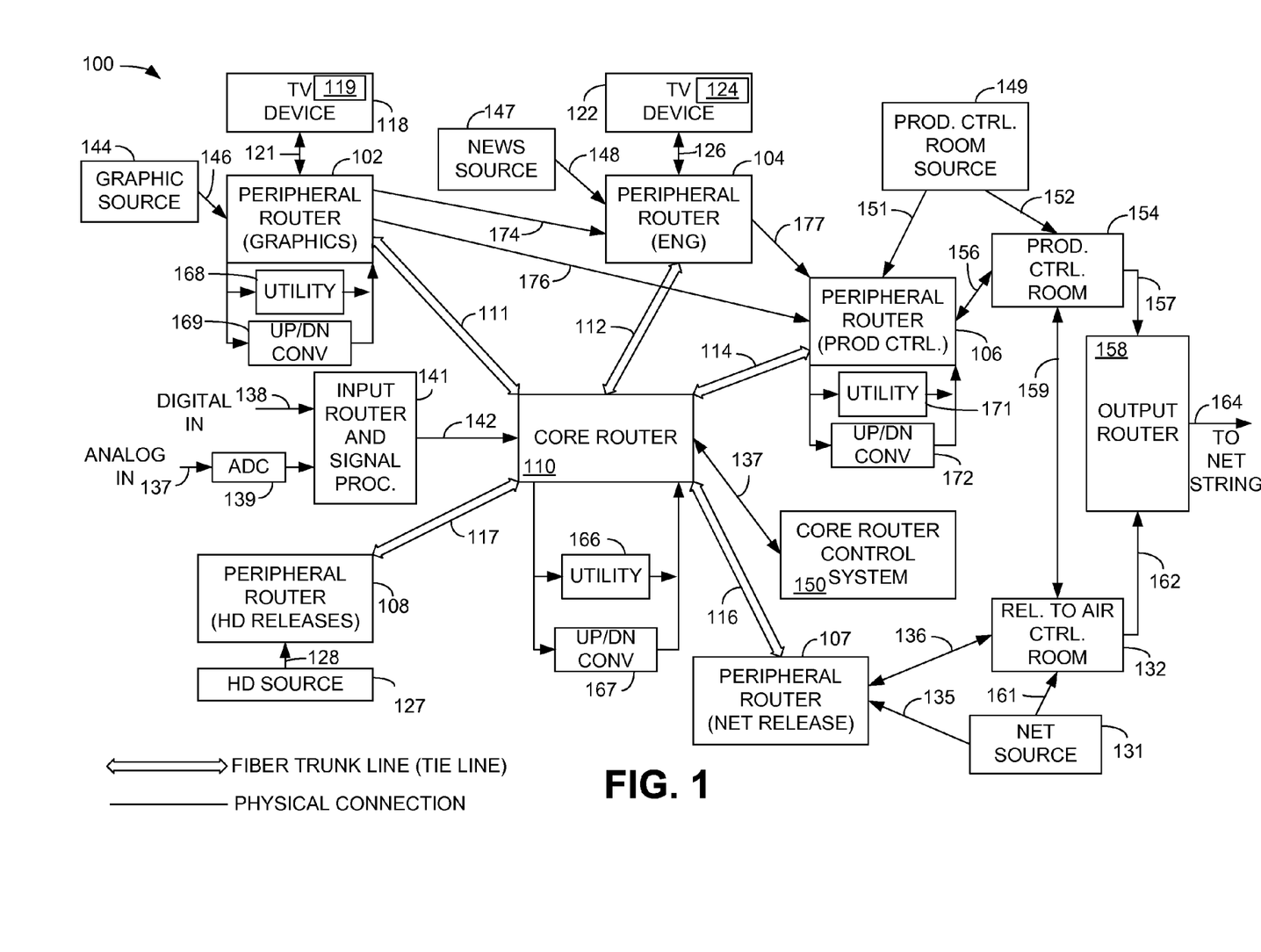
FIG. 1 is a block diagram illustrating an example of a system for intelligent routing in a television production studio.

FIG. 1 is a block diagram illustrating an example of a system for intelligent signal routing in a television production studio. The system 100 illustrates only the portions and elements of a television production studio that are relevant to the description of the system and method for intelligent signal routing in a television production studio. Those having ordinary skill in the art will understand that the system 100 illustrates only those portions of a television production studio involved in the transfer, or routing, of signals from one television device, or router, to another.

The system 100 includes a core router 110 that is coupled to a plurality of peripheral routers over a number of broadband communication channels. The number of peripheral routers is dependent upon the particular production studio and is shown here as illustrative only. For example, in an embodiment, the core router 110 is coupled to a first peripheral router 102 over wideband connection 111. For example purposes only, the peripheral router 102 can be a graphics router, and the wideband connection 111 can be a fiber optic communication trunk line, also referred to herein as a tie line.

Similarly, in an embodiment, the core router 110 is coupled to a second peripheral router 104 over connection 112. In an embodiment, the second peripheral router 104 can be referred to as an "electronic news gathering" (ENG) router. The connection 112 can be a trunk line similar to the connection 111. In this example, the core router 110 is coupled to a third peripheral router 106 via connection 114, to a fourth peripheral router 107 via connection 116, and to a fifth peripheral router 108 via connection 117. In this example, the third peripheral router 106 can be a production control router, the fourth peripheral router 107 can be a network release (net release) router, and the fifth peripheral router 108 can be a high definition release (HD release) router. The connections 114, 116 and 117 may be fiber trunk lines similar to the connections 111 and 112.

In this example, the first peripheral router 102 is connected to a television device 118 over connection 121. The television device 118 includes an asset 119. A single asset 119 is shown for illustrative purposes only. Typically, a television device, such as the television device 118, includes a plurality of assets 119. A television device can be a video server, graphics device or any device configured to move, broadcast, transmit media, data, etc. An asset could be a graphical image, video, a sound clip, a graphics title or a short animation (which can be played from a video server), or any other data, media type or content, etc.

A graphics source 144 is also connected to the first peripheral router 102 via connection 146. Because the first peripheral router 102 is, in this example, a graphics router, the graphics source 144 is used to provide any graphic information that is desirable to be impressed, incorporated in or imposed on a television signal.

In an embodiment, a utility 168 and an upconversion/downconversion element 169 can also be coupled to the first peripheral router 102. In this example, the utility 168 can be used to provide a signal conversion function, so as to allow a desired definition signal to be supplied from the first peripheral router 102. For example, if the graphics source 144 provides a standard definition (SD) signal, and the routing destination is to an element requesting a high definition (HD) signal, the utility 168 and the upconversion/downconversion element 169 can convert the standard definition signal to a high definition signal. Conversely, if the graphics source 144 provides a high definition signal, and the destination requests a standard definition signal, then the utility 168 and the upconversion/downconversion element 169 can downconvert the HD signal to an SD signal. It should be mentioned that the graphics source 144 providing either a standard definition or a high definition signal is provided for example purposes only. The television device 118 may also supply signals that can be upconverted or downconverted as described above. Further, any of the sources or devices connected to any of the peripheral routers described herein, can include the up and down conversion capability.

In an embodiment, the core router 110 also includes a utility 166 and an upconversion/downconversion element 167, which function similarly to be utility 168 and upconversion/downconversion element 169 described above. However, in accordance with an embodiment of the system and method for intelligent signal routing in a television production studio, the utility 166 and the upconversion/downconversion element 167 allow the core router 110 to provide this additional functionality separate from any conversion functionality provided by any of the peripheral routers.

The second peripheral router 104, which in this example is an electronic news gathering (ENG) router, is connected to a news source 147 via connection 148. The news source 147 may provide edited or unedited news stories for inclusion into a news program to the second peripheral router 104. The second peripheral router 104 is also connected to a television device 122, which can be similar to the television device 118. The television device 122 may include at least one television asset 124. In an example, any of the information from the graphic source 144, the asset 119, the news source 147 and the asset 124 can be intelligently routed from any source router to any destination router in the system 100 through the operation of the core router 110.

The third peripheral router 106, which in this example is a production control router, is connected to a production control room source 149 via connection 151, and is connected to a production control room 154 via connection 156. The third peripheral router 106 may also include a utility 171 and an upconversion/downconversion element 172, similar to the utility 168 and the upconversion/downconversion element 169 described above. The connection 151 from the production control room source 149 to the third peripheral router 106 is illustrated as a uni-directional connection, and the connection 156 between the third peripheral router 106 and the production control room 154 is illustrated as a bidirectional communication channel, as known to those skilled in the art. Further, the production control room source 149 may also supply source information to the production control room 154 over connection 152. Source materials on the production control router 106 include cameras, production switching outputs, dedicated graphics devices, or any other source devices or materials, etc.

The fourth peripheral router 107, which in this example is a network release (net release) router, provides network source information from network source 131 over connection 135. Network source material provided to the fourth peripheral router 107 may include, for example, programming and commercials to air, automation system outputs, emergency information "crawls" (such as a severe weather or similar warnings). The fourth peripheral router 107 may also be connected to a release to air control room 132 over bidirectional connection 136. The connection 136 is similar to the connection 156. The network source element 131 also provides network source information to be released to air control room 132 over connection 161.

The fifth peripheral router 108, which in this example is a high definition release (HD release) router, receives high definition source information from high definition source element 127 over connection 128.

In an embodiment, a digital input signal is provided over connection 138 to an input router and signal processing element 141. An analog input signal is provided over connection 137 to an analog-to-digital converter (ADC) 139, which digitizes the analog signal and provides another input to the input router and signal processing element 141. The digital input signal on connection 138 and the analog input signal connection 137 can be any inbound digital or analog signal that is to be processed by the system 100. The input router and signal processing element 141 receives all of the inbound signals and performs frame synchronization, audio processing, and any other signal conditioning in order to provide a signal on 142 that is compatible with the signal standards and formats of the system 100.

The production control room 154 is connected to an output router 158 via connection 157. The release to air control room 132 is connected to the output router 158 via connection 162. The output router 158 combines the output signals on connection 164 and provides an output to a network element. In an embodiment, the output on connection 164 can be referred to as a "net string." A "net string" is a generalized term that describes the equipment used to transmit a television signal to network affiliates. This includes final signal processing (audio limiting, and video processing), closed captioning inserters, digital signal encoders (e.g., HD to MPEG), and network-to-affiliate control systems. The production control room 154 is further coupled to the release to air control room 132 via connection 159.

The core router 110 is coupled to a core router control system 150 over connection 137. The core router control system 150 includes processing elements, memory, and software that allow the core router 110 to perform intelligent signal routing within the system 100. The core router 110 and the core router control system 150 allows the peripheral routers described above to retain their individual control systems, while enabling and controlling the transfer of information between and among any of the peripheral routers. In this manner, the routing and transfer of signals from elements and devices that may be managed by different control systems within an existing television production studio can be accomplished from one device to another with a minimal amount of overhead processing. Further, because the core router 110 and the core router control system 150 need not have access to any proprietary, or router specific information for any of the peripheral routers described above, the core router 110 and the core router control system 150 can be easily implemented and integrated into any existing television production studio. The operation of the core router control system 150 will be described in greater detail below.

Figure 2:
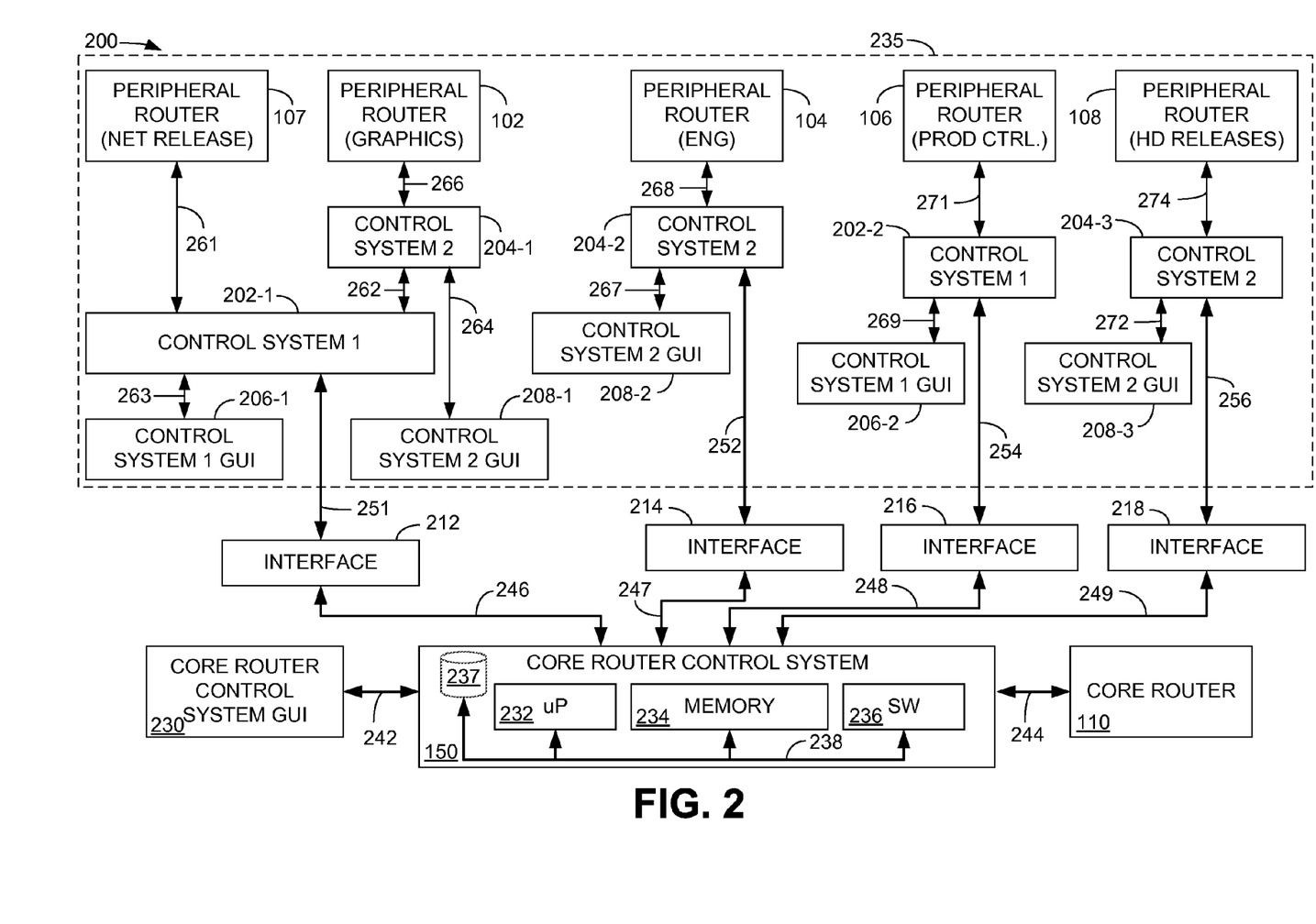
FIG. 2 is a block diagram illustrating an embodiment of the core router control system of FIG. 1.

FIG. 2 is a block diagram illustrating an embodiment of the core router control system 150 of FIG. 1. The diagram 200 includes the peripheral routers described above with respect to FIG. 1. In this example, the peripheral routers are managed by two different control systems. Different instances of the same control system are described using the nomenclature XXX-1, where the digit following the dash (-) refers to a distinct instance of the control system denoted by XXX. For example, the fourth peripheral router 107 is managed by a first control system, referred to as 202-1, while the first peripheral router 102 is managed by a second control system, referred to as 204-1. The nomenclature for the first control system and the second control system reflects that numerous iterations of each control system are described in FIG. 2. For example, a separate instance of the second control system 204-2 also manages the second peripheral router 104. An instance of the first control system 202-2 manages the third peripheral router 106 while an instance of the second control system 204-3 manages the fifth peripheral router 108. In this example, two different control systems are used to manage the five different peripheral routers. However, other numbers of routers and router control systems are anticipated.

In an embodiment, each router control system also includes a control system graphic user interface (GUI), also referred to as a GUI. For example, the first router control system 202-1 is connected via connection 263 to a first control system GUI 206-1. Similarly, the second control system 204-1 is coupled to a second control system GUI 208-1 over connection 264. In this example, the first control system 202-1 is also connected to the second control system 204-1 over connection 262. Further, the first control system 202-1 is connected to the fourth peripheral router 107 over connection 261, and the second control system 204-1 is connected to the first peripheral router 102 over connection 266.

The second control system 204-2 is connected to the second peripheral router 104 over connection 268, and is connected to the second control system GUI 208-2 over connection 267. Similarly, the first control system 202-2 is connected to the third peripheral router 106 over connection 271, and is connected to the first control system GUI 206-2 over connection 269. The second control system 204-3 is connected to the fifth peripheral router 108 over connection 274 and is connected to the second control system GUI 208-3 over connection 272.

Each iteration of the first control system and the second control system is also connected to an interface. For example, the first control system 202-1 is connected to an interface 212 over connection 251. The second control system 204-2 is connected to interface 214 over connection 252. Similarly, the first control system 202-2 is connected to interface 216 over connection 254, and the second control system 204-3 is connected to the interface 218 over connection 256.

The interfaces 212, 214, 216 and 218 are connected to the core router control system 150 over respective connections 246, 247, 248 and 249. The interfaces 212, 214, 216, and 218 provide communication, protocol translation, control and functional interfaces between the existing control systems and the core router control system 150.

The core router control system 150 includes a processor 232, a memory 234, core router control system software 236, and a database 237, all connected over a communication bus 238. The core router control system software 236 includes the software used to provide the core router control and switching functions described herein. While the core router control system software 236 is illustrated as a single element in the core router control system 150, it should be understood that the core router control system software 236 may be distributed among other elements. The core router control system 150 is connected to the core router 110 over connection 244 and is connected to a core router control system GUI 230 over connection 242.

As illustrated in FIG. 2, the existing routers and control systems 235 can all be connected to the core router control system 150 and the core router 110 so that the core router control system 150 can provide intelligent signal routing between and among existing routers and devices connected to the routers.

Figure 3:
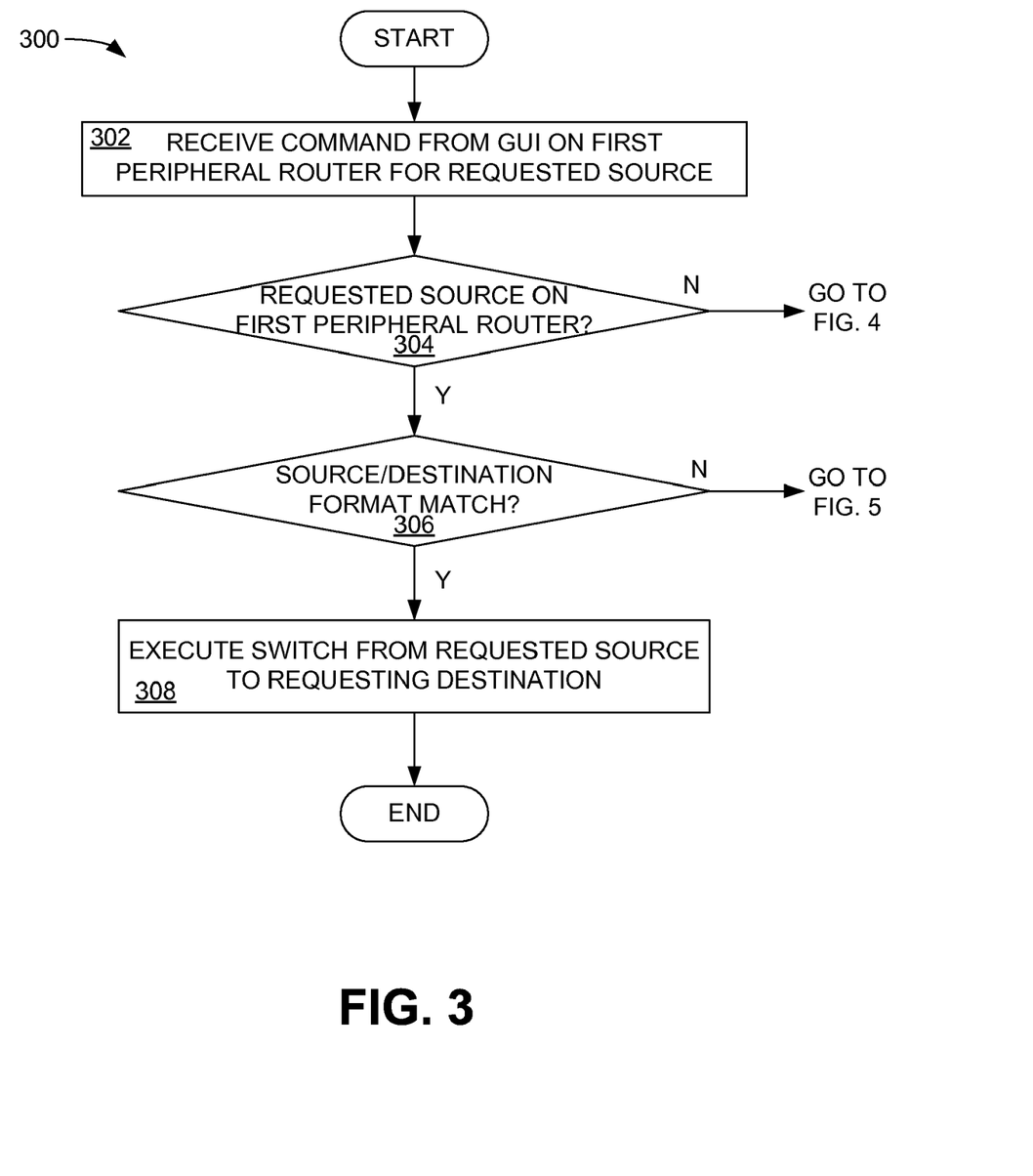
FIG. 3 is a flow chart describing the operation of an embodiment of the core router control system of FIG. 2.

FIG. 3 is a flow chart 300 describing the operation of an embodiment of the core router control system of FIG. 2. The blocks in the flowchart of FIG. 3, and the flowcharts to follow, can be performed in or out of the order shown. In block 302 the core router control system 150 receives a command from the second control system GUI 208-1 associated with the first peripheral router 102, for a requested source asset. In this example, the first peripheral router 102 is considered the destination router. For example, the requested source can be a graphics source. In block 304, it is determined whether the requested source is located on the first peripheral router 102. If it is determined that the requested source is not located on the first peripheral router 102, then the process proceeds to FIG. 4, which will be described below.

If it is determined that the requested source is located on the first peripheral router 102, then, in block 306, it is determined whether the source and destination formats match. This processing assumes that the source and destination routers are the same. For example, the requested source can be a graphics source.

If, it is determined that the source and the destination formats do not match, then the process proceeds to FIG. 5, which will be described below. If however, it is determined that the source and destination formats match, such as both being an HD signal format, then, in block 308, the core router control system 150 executes switching from the requested source to the requesting destination and the process ends.

Figure 4:
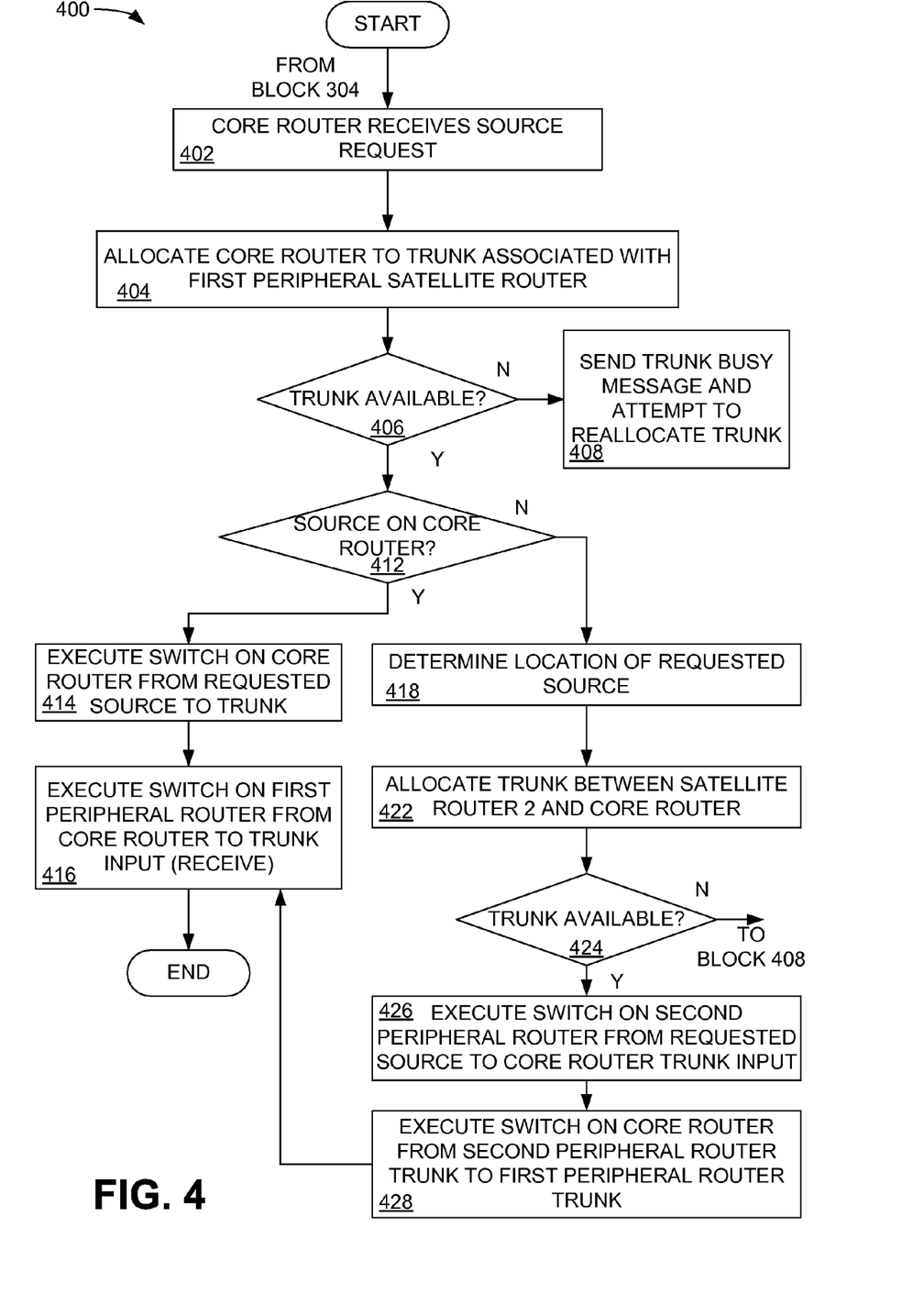
FIG. 4 is a flow chart describing the operation of an alternative embodiment of the core router control system of FIG. 2.

FIG. 4 is a flow chart describing the operation of an alternative embodiment of the core router control system of FIG. 2. The description of FIG. 4 assumes that the source information is not located on a first peripheral router 102 and the destination is a second peripheral router 104. If it is determined in block 304 (FIG. 3) that the requested source was not located on the first peripheral router 102, then, in block 402, the core router 110 receives the source request.

In block 404, the core router 110 is allocated to the trunk 111 associated with the first peripheral router 102. In block 406, it is determined whether the trunk 111 is available. If the trunk is not available, then, in block 408, the core router 110 sends a trunk busy message and attempts to reallocate the trunk 111.

If, it is determined that the trunk is available, then, in block 412, it is determined whether the source is associated with the core router 110. If the source is associated with the core router 110, then, in block 414, the core router control system 150 executes switching from the requested source to the trunk 111.

In block 416, the core router 110 then executes switching of the requested source from the first peripheral router 102 to the input of the trunk 111, where the source is received by the core router 110. The process then ends.

If, in block 412 it is determined that the source is not on the core router 110, then, in block 418, the location of the requested source is determined by the core router 110. In block 422, a trunk 112 is allocated between the second peripheral router 104 and the core router 110. In block 424, it is determined whether the trunk 112 is available. If the trunk 112 is not available, then, the process proceeds to block 408. If however, it is determined that the trunk is available, then, in block 426, the core router 110 executes switching on the second peripheral router 104 from the first peripheral router 102 to the input trunk 112 associated with the core router 110. Then, in block 428, the core router 110 executes switching to connect the trunk 112 associated with the second peripheral router 104 to the trunk 111 associated with the first peripheral router 102.

Then, the process proceeds to block 416, where the core router 110 then executes switching of the requested source from the first peripheral router 102 to the input of the trunk 111, where the source is received by the core router 110 and delivered to the second peripheral router 102.

Figure 5:
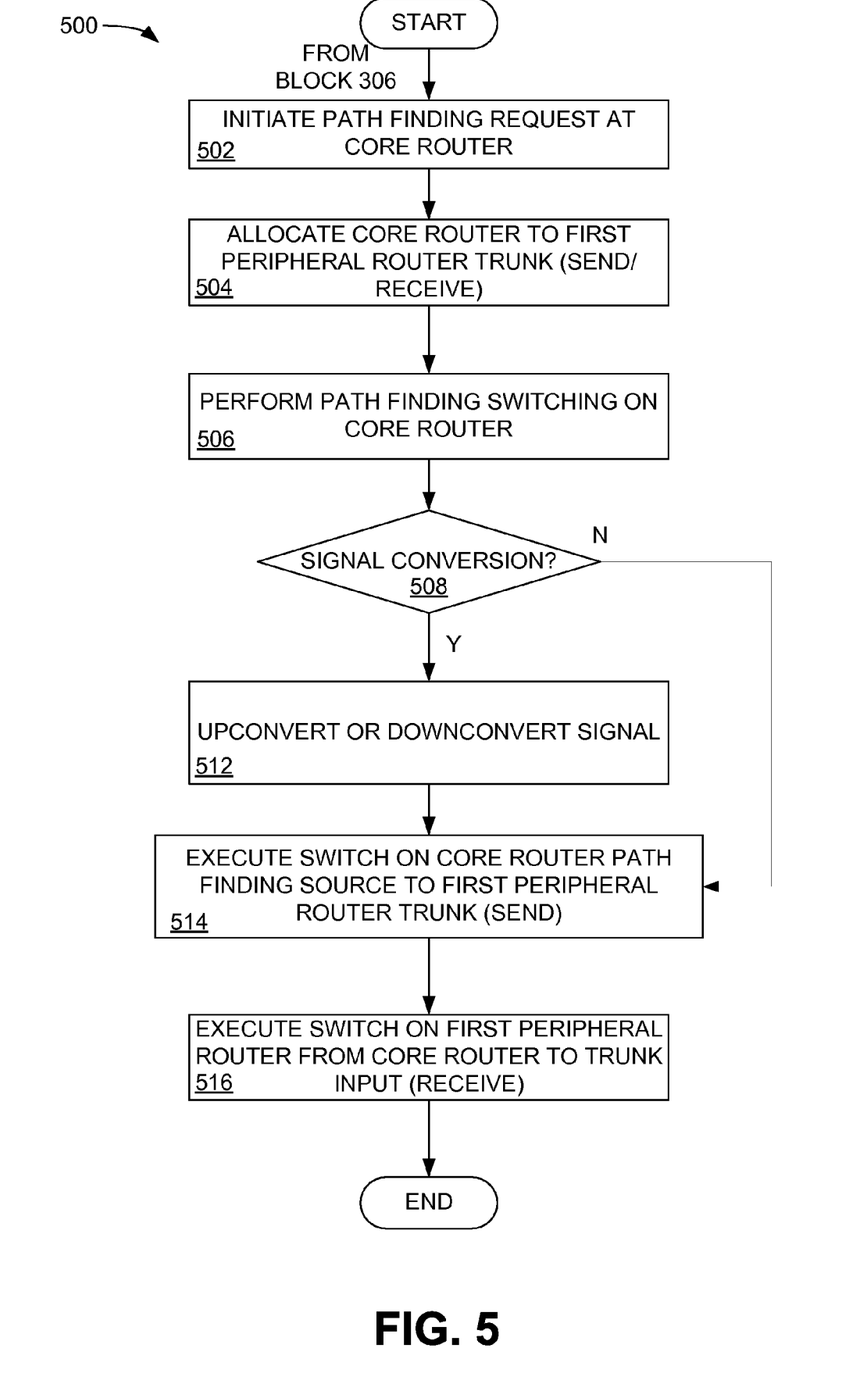
FIG. 5 is a flow chart describing the operation of another alternative embodiment of the core router control system of FIG. 2.

FIG. 5 is a flow chart describing the operation of another alternative embodiment of the core router control system of FIG. 2. The description of FIG. 5 illustrates the path finding aspect of the core router 110. The core router control system 150 includes a database 237 (FIG. 2). The database 237 includes all of the pertinent information for each source, such as the source's mnemonic name in the system (i.e., VTR1), the type of signal the source provides (HD or SD), the port that the source is connected to in each of the routers (i.e., graphics router physical input #1). The database 237 also includes the pertinent information for each destination in the studio, such as the type of signal the destination is expecting to receive (e.g., HD or SD) and what port the destination is connected to (e.g., production router physical output #1).

The core router control system 150 uses the information in the database 237 to route a signal through the appropriate up/downconversion element 167 so that the signal arrives at the peripheral router (and device connected to that peripheral router) in the correct signal format (SD or HD). For instance, if the destination that requests a device is an SD destination and an HD device was requested, in addition to establishing the tie-lines, the core router control system 150 will also route the HD signal through a downconverter 167 converting the signal to SD, which would then be routed through the tie line to the requesting peripheral router.

If it is determined in block 306 that the source and destination formats do not match, then, in block 502 the core router 110 initiates a path finding request. In block 504, the core router 110 is allocated to the trunk 111 associated with the first peripheral router 102. In block 506, the core router 110 performs path finding switching.

In block 508, it is determined if signal conversion is desired. If no signal conversion is desired, the process proceeds to block 514. If signal conversion is desired, then, in block 512, and as an example only, the core router 110 performs downconversion on the requested source material as described above.

In block 514, the core router 110 executes switching on the path finding source to the trunk 111 associated with the first peripheral router 102. In block 516, the core router 110 executes switching on the first peripheral router 102 from the core router 110 to the input of the trunk 111.

While various embodiments of the invention have been described, it will be apparent to those of ordinary skill in the art that many more embodiments and implementations are possible that are within the scope of the invention. The system and method for intelligent signal routing in a television production studio is not limited to a specific type of television device or asset.

What is claimed is:

1. A system for signal routing in a television production studio, comprising:
   a core router operatively coupled to a plurality of peripheral routers, each of the plurality of peripheral routers having an associated control system, where a first peripheral router is associated with a first router control system and where a second peripheral router is associated with a second router control system, the first and second router control systems being dissimilar; and
   a core router control system coupled to the core router and coupled to the plurality of peripheral routers, the core router control system to allow any peripheral router to communicate with any other peripheral router through the core router irrespective of the router control system associated with each peripheral router, the core router control system further comprising a database containing router-specific information for each of the plurality of routers, the core router control system to allow the first peripheral router to communicate directly with the second peripheral router without having any proprietary router information.

2. The system of claim 1, further comprising an upconversion/downconversion element associated with the core router, the upconversion/downconversion element to convert a signal switched by the core router between at least two broadcast standards.

3. The system of claim 1, in which the core router control system includes information on each peripheral router to enable communication between and among the plurality of peripheral routers and the core router.

4. The system of claim 1, wherein the database allows the core router control system to perform signal conversion.

5. The system of claim 1, wherein the database allows the core router control system to perform signal routing in accordance with the contents of the database.

6. The system of claim 1, further comprising an upconversion/downconversion element associated with at least one peripheral router, the upconversion/downconversion element to convert a signal between at least two broadcast standards.

7. A method for signal routing in a television production studio, comprising:
   receiving a command from a peripheral router for an asset at a requested source, the command received at a core router operatively coupled to a plurality of peripheral routers, each of the plurality of peripheral routers having an associated control system, where a first peripheral router is associated with a first router control system and where a second peripheral router is associated with a second router control system, the first and second router control systems being dissimilar;
   determining the location of the requested source;
   determining whether a format associated with the source and a destination match; and
   when the format associated with the source and a destination match, routing the asset from the requested source to a desired destination, using a core router control system coupled to the core router and coupled to the plurality of peripheral routers, the core router control system to allow any peripheral router to communicate with any other peripheral router through the core router irrespective of the router control system associated with each peripheral router, the core router control system further comprising a database containing router-specific information for each of the plurality of routers, the core router control system to allow the first peripheral router to communicate directly with the second peripheral router without having any proprietary router information.

8. The method of claim 7, wherein when the format associated with the source and the destination do not match, initiating a path finding request.

9. The method of claim 8, wherein the path finding request further comprises:
   determining a source peripheral router;
   determining a destination peripheral router; and
   connecting the source peripheral router to the destination peripheral router through a core router.

10. The method of claim 9, wherein the path finding request further comprises allowing the core router control system to perform signal conversion.

11. The method of claim 7, further comprising an upconversion/downconversion element associated with the peripheral router, the upconversion/downconversion element to convert a signal between at least two broadcast standards.

12. A method for signal routing in a television production studio, comprising:
   receiving a request for an asset, the request originating at a first peripheral router, the request received at a core router operatively coupled to a plurality of peripheral routers, each of the plurality of peripheral routers having an associated control system, where a first peripheral router is associated with a first router control system and where a second peripheral router is associated with a second router control system, the first and second router control systems being dissimilar;
   allocating a first trunk to a core router, the first trunk associated with the first peripheral router;
   determining whether the asset is associated with the core router; and
   if the asset is associated with the core router, delivering the asset to the first peripheral router, using a core router control system coupled to the core router and coupled to the plurality of peripheral routers, the core router control system to allow any peripheral router to communicate with any other peripheral router through the core router irrespective of the router control system associated with each peripheral router, the core router control system further comprising a database containing router-specific information for each of the plurality of routers, the core router control system to allow the first peripheral router to communicate directly with the second peripheral router without having any proprietary router information.

13. The method of claim 12, in which if the asset is not associated with the core router, further comprising:

determining a location of the asset, where the asset is located on a second peripheral router;

allocating a second trunk between the second peripheral router and the core router; and delivering the asset from the second peripheral router to the first peripheral router via the core router.

14. The method of claim 12, further comprising an upconversion/downconversion element associated with the core router, the upconversion/downconversion element to convert a signal switched by the core router between at least two broadcast standards.

15. The method of claim 14, further comprising an upconversion/downconversion element associated with the peripheral router, the upconversion/downconversion element to convert a signal between at least two broadcast standards.

16. The method of claim 12, wherein the database allows the core router control system to perform signal routing in accordance with the contents of the database.

17. A system for signal routing in a television production studio, comprising:

a core router operatively coupled to a plurality of peripheral routers, each of the plurality of peripheral routers having an associated individual control system, where a first peripheral router is associated with a first router control system and where a second peripheral router is associated with a second router control system, the first and second router control systems being dissimilar; and a core router control system coupled to the core router and coupled to the plurality of peripheral routers, the core router control system to allow any peripheral router to communicate with any other peripheral router through the core router irrespective of the control system associated with each peripheral router, thus allowing each of the plurality of peripheral routers to retain their individual control systems, while enabling and controlling the transfer of information between and among any of the peripheral routers, the core router control system further comprising a database containing router-specific information for each of the plurality of routers, the core router control system to allow the first peripheral router to communicate directly with the second peripheral router without having any proprietary router information.

18. The system of claim 17, in which the routing and transfer of signals from each of the plurality of peripheral routers may be managed by different control systems within an existing television production studio and can be accomplished from one of the plurality of peripheral routers to another of the plurality of peripheral routers with minimal overhead processing.

19. The system of claim 18, further comprising at least one interface coupled between the core router and at least one peripheral router, the interface to provide communication, protocol translation, control and a functional interface between an existing control system associated with the at least one peripheral router and the core router control system.

* * * * *